United States Patent [19]

Foltz

[11] Patent Number: 4,867,097

[45] Date of Patent: Sep. 19, 1989

[54] END DAM

[75] Inventor: John R. Foltz, East Windsor, N.J.

[73] Assignee: Union Camp Corporation, Wayne, N.J.

[21] Appl. No.: 207,410

[22] Filed: Jun. 15, 1988

[51] Int. Cl.[4] .................... B29C 1/04

[52] U.S. Cl. .................... 118/407; 118/410

[58] Field of Search .................... 118/410, 406, 407

[56] References Cited

U.S. PATENT DOCUMENTS

| | | | |
|---|---|---|---|
| 4,327,662 | 5/1982 | Damrau | 118/410 |
| 4,396,648 | 8/1983 | Holt et al. | 118/410 |
| 4,398,494 | 8/1983 | Alheid | 118/410 |
| 4,426,412 | 1/1984 | Gebert et al. | 118/410 |
| 4,440,809 | 4/1984 | Vreeland | 118/413 |
| 4,503,804 | 3/1985 | Damrau | 118/410 |
| 4,512,279 | 4/1985 | Damrau et al. | 118/413 |
| 4,534,309 | 8/1985 | Damrau et al. | 118/410 |
| 4,688,516 | 8/1987 | Sommer | 118/410 |

*Primary Examiner*—Willard Hoag

*Attorney, Agent, or Firm*—Edward J. Sites

[57] ABSTRACT

An end dam for use in a coater head which applies a coating material under pressure from a reservoir onto a web is shown to include an attachment arrangement for attaching the end dam to the coater head a first wall which prevents the lateral movement of the coating material, thereby defining one end of the reservoir, a second wall, spaced from the first wall and laterally away from the reservoir, such that a channel is formed therebetween so that coating material passing over the first wall experiences a drop in pressure sufficient to maintain the coating material within the channel.

8 Claims, 2 Drawing Sheets

END DAM

FIELD OF THE INVENTION

The present invention relates to the field of manufacturing web products wherein a coating is applied to the web, and more particularly to the field of coater heads used in the application of a coating to a web.

BACKGROUND OF THE INVENTION

In the manufacture of web based products, such as paper, textiles and certain plastics, it is sometimes desirable to apply a coating to the surface of the web such as a starch coating or other polymer coating. Having a suitable formulation, such coatings provide improved gloss, slickness, color, printing detail, or brilliance to the particular web being manufactured. Unfortunately, such coatings have a tendency to accumulate on the web manufacturing equipment, periodically requiring removal. As will be appreciated, any downtime necessary for the removal of accumulated coating material can result in substantial cost to the manufacturer. Consequently, there is a need in the manufacture of web based products for methods ad apparatus for controlling the flow of coating material in order to minimize downtime required to clean or remove such material from the manufacturing equipment.

Coatings are typically applied by a coater head which is moved into a position approximate the web which in turn is generally carried by or tensioned against a roll or drum. The distance the coater head is spaced from the web generally determines the thickness of the coating. More particularly, such coater heads usually are provided with a blade, the leading edge of which is oriented at a certain angle relative to the direction of movement of the web and resting on the web, applying a certain loading. The loading of the blade leading edge determines in most instances the thickness of the coating being applied.

Generally, in order to assure a flow of coating material onto the web, behind the leading edge of the blade, a pool or reservoir chamber of pressurized coating material is formed between the coating head and the web with the blade forming one wall thereof. End dams are typically positioned at either end of the reservoir chamber, abutting the blade and forming the end walls of the reservoir. The back and bottom walls of the reservoir are formed from other components of the head and in some instances may be integral therewith. Unfortunately, the effectiveness of the prior end dams in maintaining the coating material within the reservoir chamber has been unacceptable.

In order to understand the effectiveness of such prior end dams, consider first their construction, for example, an end dam used in the coater head of a short dwell blade coater. This coater head is provided with a finger-like projection having a width generally equal to the width of the coater head and which extends into the reservoir. The end dam, typically made of felt or a flexible synthetic material, is provided with a corresponding groove so that the end dam can be positioned at any point along such projection. The end dam also includes an end wall which defines one end of the reservoir chamber. As is known, the spacing of a pair of end dams along the projection determines the width of the coating to be applied to the web.

The end dam effectiveness problem at first stemmed from the formation of the end dam from felt material. The felt would absorb the coating material and change shape to an extent that the blade was moved out of position which produced a non-uniform coating on the web. In an attempt to resolve this problem, end dams constructed from foam rubber were mounted in the coater. However, since it is undesirable to have this type of material contact the web during the coating operation, it was necessary to space by a small amount the surface of the rubber end dam from the moving web. Coating material leaked through the space between the web and the top of the end dam wall. Since the coating material is pressurized, a small portion will flow continuously through this narrow opening and collect on the web manufacturing equipment. After awhile so much of the coating material builds up on the equipment that the manufacturing process must be halted in order to remove the material, resulting in unwanted downtime.

SUMMARY OF THE INVENTION

An end dam for use in a coater head which applies a coating material under pressure from a reservoir onto a web is shown to include an attachment arrangement for attaching the end dam to the coater head a first wall which prevents the lateral movement of the coating material, thereby defining one end of the reservoir, a second wall, spaced from the first wall and laterally away from the reservoir, such that a channel is formed therebetween so that coating material passing over the first wall experiences a drop in pressure sufficient to maintain the coating material within the channel. Such end dams can be integrally formed from foam rubber.

DETAILED DESCRIPTION OF THE INVENTION

Although the present invention may be used to apply web coatings in any industry involved with web processing technology, for the purposes of illustration the invention will be described as used in a paper manufacturing operation.

Figure 1:
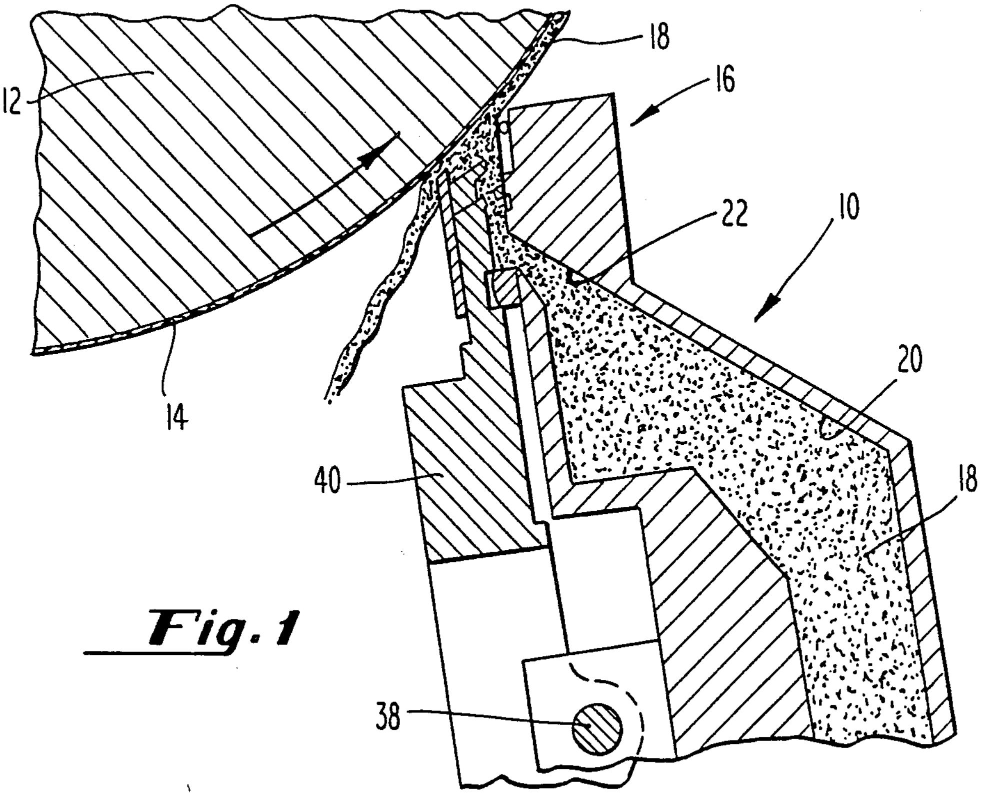
FIG. 1 is a section view of a short dwell coater head incorporating the end dam of the present invention.

As shown in FIG. 1, a short dwell coater, generally designated 10, is positioned immediately adjacent drum 12 against which web 14 is tensioned. As drum 12 moves web 14 past the coater head 16, a layer of coating material 18 is deposited onto web 14. Although not shown, it will be understood that coater head 16 is moved into the position shown in FIG. 1, in relation to web 14, by any known apparatus or device used for this purpose.

Coating material 18 is supplied under pressure from a source (not shown) to a chamber 20 formed within the short dwell coater 10. Fluid communication is established between chamber 20 and coater head 19 by passage 22. Since coater head 16 is constructed to extend across the width of web 14, it is necessary to ensure that the flow of coating material is uniformly distributed across the coater head length. To this end, passage 22 is formed to establish fluid communication across the length of coater head 16.

Figure 2:
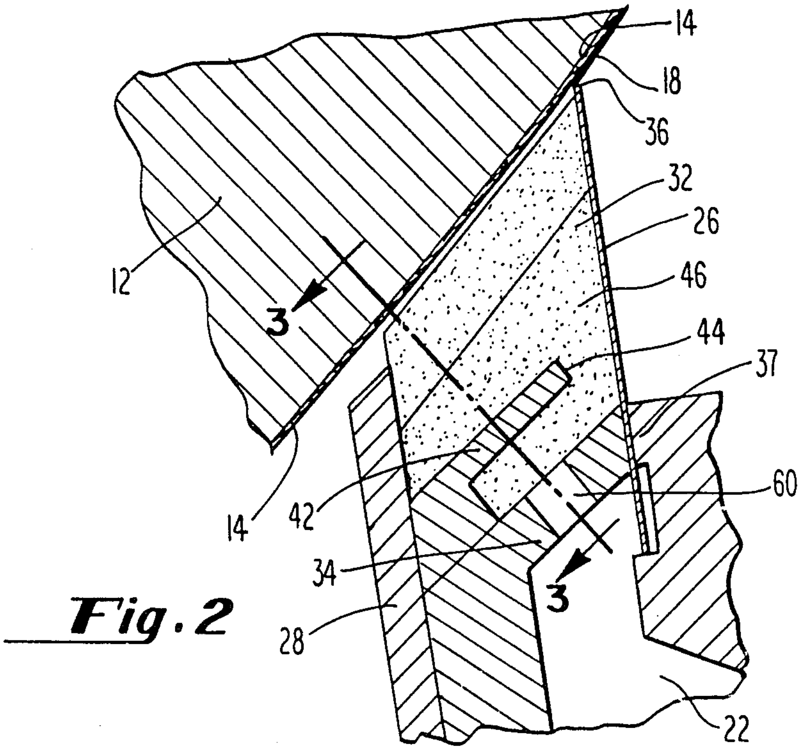
FIG. 2 is an enlargement of a portion of the coater head of FIG. 1.
Figure 3:
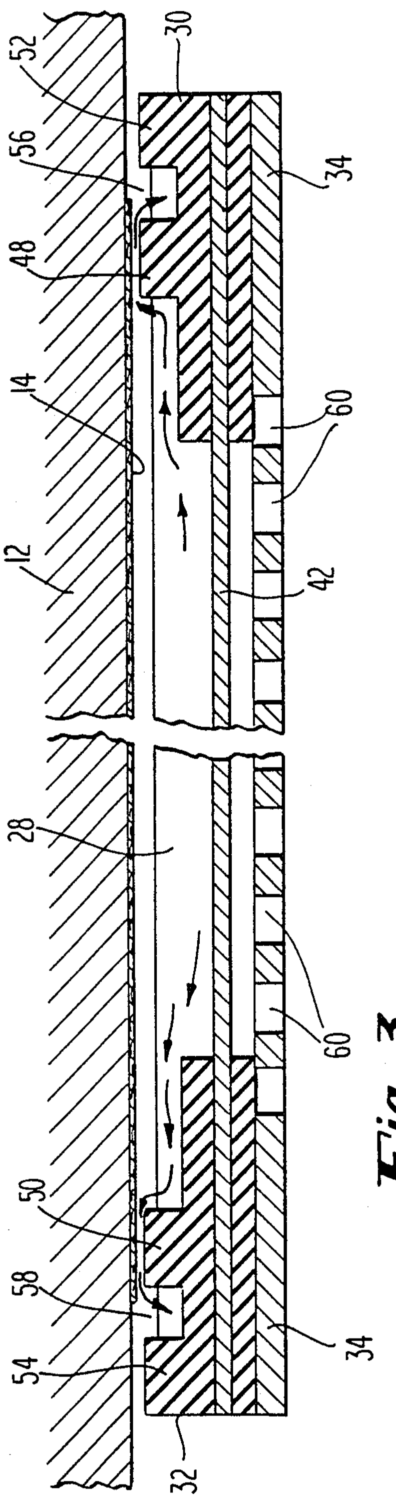
FIG. 3 is a section view taken along the line 3—3 of FIG. 2.

As can be seen more clearly in FIGS. 2 and 3, coater head 16 forms a pool or reservoir 24 of coating material immediately adjacent and in contact with web 14. Reservoir 24 is formed in coater head 16 by coater blade 26, baffle 28, end dams 30 and 32, and bottom wall 34. As shown in FIG. 2, blade 26 forms the trailing wall of head 16 with respect to the movement of web 14 and includes a top edge 36 which is oriented substantially parallel to web 14.

Blade 26 is held in place by the pinching action which occurs between the forward end of bottom wall 34 and the rearward end of projection 37 Such pinching action is the result of pivoting the front portion of the coater, containing chamber 20 and projection 37, about pivot pin 38 in a counterclockwise direction. The reverse movement can also produce this pinching action, namely the pivoting of the rear portion 40 in a clockwise direction about pivot pin 38.

End dams 30 and 32 are held in place at opposite lateral ends of the reservoir by their attachment to finger-like projection 42. Projection 42 is shown in FIG. 3 to have a width generally equal to the width of coater head 16 and extends into the reservoir volume as shown in FIG. 2. The attachment of end dams 30 and 32 is achieved by the provision of a slot or groove 44 formed in the body portion 46 of the end dam. Since groove 44 extends through body 46, end dams 30 and 32 can be moved laterally to any desired position along projection 42. In this fashion, the width of the of the reservoir and consequently the width of the coating applied to web 14 is controlled to a desired distance. End dams 30 and 32 are also shown to include an inner wall 48 and 50, respectively, and an outer wall 52 and 54, respectively. Channels 56 and 58 are defined between such inner and outer walls. As will be described, channels 56 and 58 serve to direct any coating material deviating from the reservoir and application to web 14 into a desired flow path for recycling or other disposal. In the preferred embodiment end dams 30 and 32 are integrally formed from foam rubber.

Consider now coater 10 during operation. Coating material 18 is supplied under pressure to chamber 20 whereupon it is presented to passage 22 which supplies coating material 18 across a substantial portion of the width of coater head 16. Coating material flows from passage 22 through a series of bores 60 in bottom wall 34 and into the reservoir formed between the coater head 16 and web 14. Passage 22 and bores 60 establish fluid communication across the effective width of the resevoir, thus ensuring a generally uniform flow of material 18 into the resevoir. As shown in FIG. 3, such bores 60 which are not necessary will be covered or closed by the under surface of end dams 30 and 32 so that material 18 does not flow therethrough.

Coating material which is not deposited onto web 14 flows over baffle 28 and is collected and recycled in any known manner. As web 14 passes over and in contact with the reservoir of coating material 18, a certain amount of material 18 adheres to web 14 creating a flow of coating material in the direction of travel of web 14 towards blade 26. Material 18 which does not pass between web 14 and blade edge 36 is retained in the reservoir.

Since material 18 is supplied under pressure, a certain amount of material seeks to escape from the reservoir through whatever gaps or spaces are available. In coater head 16 there are four gaps, namely the space between web 14 and blade edge 36, the space between web 14 and baffle 28, the space between web 14 and end dam 30 and the space between web 14 and end dam 32. Material which passes through the space defined by edge 36 is of no concern since this represents material which has been deposited onto web 14. Material 18 which passes through the space defined by baffle 28 is also of no concern since this material will be collected and possibly recycled. Material 18 which passes through the space defined by end dams 30 and 32 however is of concern because material passing through these spaces can cause the previously described problems.

Figure 4:
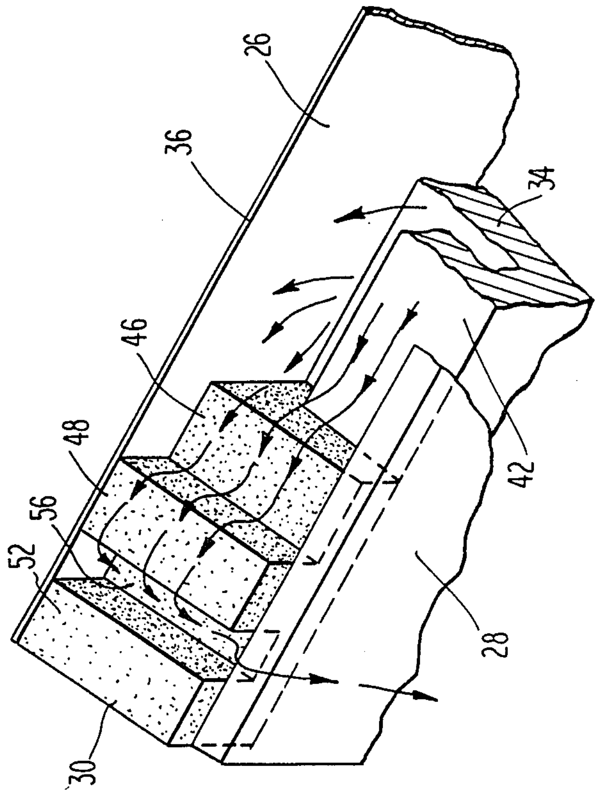
FIG. 4 is a perspective view of a portion of one end of the coater head of FIG. 1.

As can be seen in FIGS. 3 and 4, a portion of material 18 upon entering the reservoir through bores 60 moves laterally towards end walls 48 and 50 until the reservoir is filled. Thereafter, material 18 slowly moves across the top of walls 48 and 50 until it reaches channels 56 and 58. Material 18 which flows into channels 56 and 58 will flow in a direction towards and over baffle 28, due to gravity. In this manner material 18 is collected and recycled such that the coating machinery does not become clogged.

With material 18 passing over the tops of walls 48 and 50 under pressure, the width of channels 56 and 58 is important. If walls 52 and 54 are not spaced a sufficient distance from walls 48 and 50, respectively, it is possible for material 18 to pass over the tops of walls 52 and 54 which will result in the problems associated with previous end dams. The width of channels 56 and 58 must be such that material 18 flowing into the channel experiences a pressure drop sufficient to maintain material 18 within the channel. As indicated, gravity will thereafter cause material 18 to flow through channels 56 and 58, over baffle 28 to whatever collection apparatus is utilized. In this manner, the present invention controls the flow of material 18 resulting in a significant reduction in downtime necessary to clean or repair the web manufacturing or coating equipment.

It will be noted in FIG. 2, that in order to minimized the amount of material which will flow over the top surfaces of walls 48 and 50, such surfaces have been formed to closely conform to the shape of web 14, i.e. curved due to being tensioned against drum 12, in the region of coater head 16.

While the invention has been described and illustrated with reference to specific embodiments, those skilled in the art will recognize that modification and variations may be made without departing from the principles of the invention as described herein above and set forth in the following claims.

What is claimed is:

1. An end dam for use in a coater head which applies a coating material under pressure in a reservoir onto a web, said end dam comprising:
   - attachment means for attaching said end dam to said coater head;
   - a first wall for preventing the lateral movement of said coating material;
   - a second wall, spaced from said first wall and laterally away from said reservoir, such that a channel is formed therebetween so that coating material passing over said first wall experiences a drop in said pressure sufficient to maintain said coating material within said channel the end dam being entirely of foam rubber and having but a single said channel.

2. The end dam of claim 1, extending wherein said attachment means comprises a groove formed in said end dam for attaching said end dam to said coater head.

3. The end dam of claim 1, wherein said first and second walls include a top surface and wherein said top surface is formed to conform to the shape of said web in the region of said coater head.

4. The end dam of claim 1, wherein said end dam is integrally formed from said foam rubber.

5. The coater head of claim 1, wherein each of said end dams is integrally formed.

6. A coater head for use in applying a coating material under pressure from a reservoir onto a web, comprising, a body member having said reservoir formed therein, said reservoir being defined by a blade, a baffle and a pair of opposed end dams, each of said end dams comprising, attachment means for attaching said end dams to said coater head, a first wall defining one end of said reservoir, a second wall, spaced from said first wall and laterally away from said reservoir, such that a channel is formed between said first and second walls so that coating material passing over said first wall experiences a drop in said pressure sufficient to maintain said coating material within said channel, said end dams being entirely of foam rubber and each having but a single said channel therein.

7. The coater head of claim 6, wherein said coater head includes a projection extending into said reservoir and wherein said attachment means comprises a groove formed in each of said end dams for attaching said end dams to said projection, thereby defining opposite ends of said reservoir.

8. The coater head of claim 6, wherein said first and second walls include a top surface and wherein said top surface is formed to conform to the shape of said web in the region of said coated head.

* * * * *